United States Patent
Lee et al.

(10) Patent No.: US 7,064,178 B2
(45) Date of Patent: Jun. 20, 2006

(54) SOLUBLE SELF-ORIENTING MATERIALS AND CONDUCTIVE POLYMER COMPOSITIONS HAVING THE SAME

(75) Inventors: Suck-Hyun Lee, Gyeonggi-Do (KR); Chan-Woo Lee, Suwon-si (KR)

(73) Assignee: Para Limited, Gyeonggi-Do (KR)

( * ) Notice: Subject to any disclaimer, the term of this patent is extended or adjusted under 35 U.S.C. 154(b) by 76 days.

(21) Appl. No.: 10/472,334

(22) PCT Filed: Feb. 26, 2002

(86) PCT No.: PCT/KR02/00311

§ 371 (c)(1),
(2), (4) Date: Mar. 23, 2004

(87) PCT Pub. No.: WO02/074833

PCT Pub. Date: Sep. 26, 2002

(65) Prior Publication Data

US 2004/0162397 A1      Aug. 19, 2004

(30) Foreign Application Priority Data

Mar. 21, 2001   (KR) ............................... 2001-14519

(51) Int. Cl.
C08G 63/02        (2006.01)
C08F 6/00         (2006.01)
(52) U.S. Cl. ...................... 528/272; 528/482; 528/486; 528/425; 525/420
(58) Field of Classification Search .............. 528/422, 528/272, 482, 486, 425; 525/420
See application file for complete search history.

(56) References Cited

U.S. PATENT DOCUMENTS

| | | | |
|---|---|---|---|
| 5,069,820 A | * | 12/1991 | Jen et al. ..................... 252/500 |
| 5,407,505 A | | 4/1995 | Groenwegen et al. |
| 5,520,852 A | * | 5/1996 | Ikkala et al. ........... 252/519.21 |
| 5,863,658 A | | 1/1999 | Tan |
| 5,882,566 A | | 3/1999 | Hsu et al. |
| 6,045,977 A | * | 4/2000 | Chandross et al. ......... 430/311 |
| 6,099,097 A | | 8/2000 | Hocker et al. |
| 6,123,883 A | | 9/2000 | Mattes et al. |

OTHER PUBLICATIONS

Patent Publication No. WO 02/077070 A1, published Oct. 3, 2002 (PCT/KR02/00312).

* cited by examiner

Primary Examiner—Duc Truong (57) ABSTRACT

The present invention relates to an electrically conductive polymer, and more particularly to an additive for enhancing electrical conductivity of the polymer and electrically conductive polymer composition containing the additive. The present invention provides a soluble self-orienting material (SOM) and an electrically conductive polymer composition containing the SOM. The SOM can be provided as a form of a monomer having an aromatic ring with various polarity, flexible side chain and hydrophilic dibasic acid, as a form of a complex consisting of the monomers linked by a hydrogen bond or a metal coordinate bond or as a form of a whole aromatic polymer having —NRCO—, —NROSO—(R: side chain including —H, —$CO_2H$, —$(CH_2)nSO_3H$, —$(CH_2)nCO_2H$ or -tert-butyloxycarbonyl) and —OCO—. And also, the composition of the present invention have higher electrical conductivity, in excess of 103 S/cm, than a conventional conductive polymer, and also have improved processability.

9 Claims, 2 Drawing Sheets

SOLUBLE SELF-ORIENTING MATERIALS AND CONDUCTIVE POLYMER COMPOSITIONS HAVING THE SAME

CROSS REFERENCE TO RELATED APPLICATION

This application is the U.S. National Stage of International Application PCT/KR02/00311, filed Feb. 26, 2002, which in turn claims priority from Korean Patent Application 2001/14519, filed Mar. 21, 2001.

TECHNICAL FIELD OF THE INVENTION

The present invention relates to conductive polymers, and more particularly it relates to an additive for enhancing electrical conductivity of the conductive polymer which forms a conductive polymer composition with said additive.

DISCUSSION OF RELATED ART

Most conductive polymers show a strong tendency to polarize and have commonly conjugated double bond that makes an inter-molecular force remarkably strong by dispersion force among electrons. By moving charges through doping step which adds an electron donor or an electron acceptor, the polymers get to conductive polymer salt with conductive values of over $10^{-8}$ S/cm.

The conductive polymers are applicable as an EMI shielding material, an antistatic material, an anticorrosive material, a static discharge material, and the like.

The advantage of the conductive polymers is that they can be variously processed, can be lightweight, and can be produced in commercial quantities.

Polyacetylene, known as the first conductive polymer, has a disadvantage of its easy oxidation in the air, and it was followed by the development of polyaniline, polypyrrole, polythiophene, and the like.

Polyaniline is especially attractive because it is not only relatively inexpensive and chemically very stable but also easily proton doped.

The polyaniline can be classified into leuco-emeralidine, completely reduced form, emeraldine, partly oxidized form, and pernigraniline, completely oxidized form, in accordance with its oxidation state.

Because the completely reduced form and completely oxidized form of polyaniline have high melting points, they cannot be processed in melt processing. Also they cannot be easily processed because they have low solubility in solvents with high boiling point such as meta-cresol and in general purpose organic solvents.

To resolve these disadvantages, it had been tried to improve both processability and conductivity by synthesis of graft-copolymers or its derivatives into which various side chains backbone of the conductive polymer is induced for enhancing the dissolution. But these compounds have a much lower electrical conductivity than the conductive polymer before reforming.

Many studies described in patents and articles have demonstrated increased proccessability and conductivity by adding various organic materials, polymers or plasticizers.

Among those, a method, which became a turning point for increasing processability and conductivity of conductive polymers, used organic sulfonic acid such as camphorsulfonic acid (CSA) or para-dodecylbenznenesulfonic acid (DBSA) as a dopant of the conductive polymers.

After that many patents relating to improving conductivity of conductive polymers are issued. Among those patents, U.S. Pat. No. 6,099,097 and U.S. Pat. No. 6,123,883 proposed methods for processing which add gel inhibitors such as second amines into polyaniline to prevent its gelation resulted from intermolecular hydrogen bond dissolving high molecular weight polyaniline, if said polyaniline is in an amount of more than 15% by weight to manufactured fibers.

But, the above two U.S. patents have a complex and costly processing procedure because they require separately adding the second additives which do not make an effect on increasing electrical conductivity of the conductive polymers.

U.S. Pat. No. 5,407,505 describes another processing method of polyaniline. This patent proposed liquid composition comprising of a strong acid solution containing polyaniline in which other polymer such as polypara-(phenylene terephthalamide) were dissolved or a solid composition comprising crystalline polyaniline dissolved in acids. However, polyaniline was not easily processed because of dissolving in strong acid, and electrical conductivity was decreased because of the unwanted reactions followed in dissolving procedure, and also the polyaniline have lower conductivity than pure polyaniline owing to adding polypara-(phenylene terephthalamide).

U.S. Pat. No. 5,882,566 describes a method of manufacturing electrically conductive fiber with high tension and high modulus using polypara-(phenylene terephthalamide). But the polymer in this patent is also manufactured by dissolving it in sulfuric acid and thus the polyaniline itself has a sulfonic functional group. As a result the polyaniline has a disadvantage that its conductivity is reduced as described above. This patent also describes a composition comprising polypara-(phenylene terephthalamide) wherein polyaniline has higher electrical conductivity than polyanilene salt form produced from sulfonated reactants, but the electrical conductivity of the composition comprising polypara-(phenylene terephthalamide) showed $10^{-3}$~2.0 S/cm, that is much lower than that of a pure polyaniline salt.

U.S. Pat. No. 5,863,658 reported conductive polymers manufactured from polymer with rigid rod form of aromatic benzazole and polyaniline increased electrical conductivity to 128 S/cm. But these polymers seem to be applicable to specific use such as film application because aromatic benzazole polymer and the polyaniline can be dissolved in only a strong acid such as methane sulfonic acid. Accordingly, rigid rod form polymers have very high thermal stability and mechanical properties, but they are difficult to melt and have a low solubility in solvents.

Besides the patents described above, a lot of research results relating to conductive polymers were described in detail in a number of publications (Organic conductive molecules and Polymers Vol. I–IV, Ed. by H. S. Nalwa, John Wiley & Sons, New York. 1997, Handbook of Conducting Polymers Vol. I, II, Ed. by Skotheim et. al. Marcel Dekker, N.Y. 1998, Conductive Polymers, P. Chandrasekhar, Kluwer Acade. Pub. Boston. 1999).

Thus by reviewing a prior art related to enhancement of the conductivity of the conductive polymers in the patents described above and various reports, it is concluded that the conductive polymers still do not have high enough electrical conductivity and processability for industrialization.

Conductive polymers have different applications according to electrical conductivity. That is, conductive polymers having the electrical conductivity of $10^{-13}$~$10^{-7}$ S/cm, $10^{-6}$~$10^{-2}$ S/cm, or more than 1 S/cm are applicable to antistatic materials, static discharge materials, or EMI shielding materials, and semiconductors or solar batteries, respectively. Accordingly upon enhancing the electrical conductivity of the polymers, they can be used in more applications.

Consequently, conductive polymers including polyaniline w are limited to extremely limited field, therefore, increasing electrical conductivity and processability of the polymer are needed for various developments of expanding their use.

DISCLOSURE OF INVENTION

It is a principal object of the present invention to provide a soluble self-orienting material as an additive for enhancing electrical conductivity of a conductive polymer.

Another object of the present invention is to provide the conductive polymer having an electrical conductivity of $10^3$ S/cm that is more 100 times than that of a doped pure conductive polymer.

Further object of the present invention is to provide a conductive polymer composition comprising the additive that can increase the solubility of the conductive polymer.

In a first aspect, the present invention provides a soluble self-orienting material of monomer form as an additive material for improving electrical conductivity of a conductive polymer. The soluble self-orienting material of monomer form is shown in General formula 1 below:

(1)

wherein p is a positive integer indicating size of hydrogen-bond form; A1 is an aromatic ring; X1 and X2 are functional groups which can be independently selected from —SO$_2$OH or —COOH as dibasic acid monomer; Z1 and Z2 are independently selected from a hydrophilic group, a hydrophobic group or an amphiphilic group).

In a second aspect, the present invention also provides a soluble self-orienting material of metal salt form as an additive material for improving electrical conductivity of a conductive polymer. The soluble self-orienting material of metal-salt form is shown in general formula 2 below:

(2)

wherein q is a positive integer; A1 is the aromatic ring; X1 and X2 are functional groups independently selected from —CO$_2$ or —SO$_3$ as conjugate base of dibasic acid monomer; Z1 and Z2 are independently selected from a hydrophilic group, a hydrophobic group or an amphiphilic group; M is alkali metal or transition metal of cationic form.

In another aspect, the present invention also provides soluble self-orienting material of a whole aromatic polymer form as an additive material for improving electrical conductivity of a conductive polymer. The soluble self-orienting material of a whole aromatic polymer form is shown in General formula 3 below:

(3)

wherein r is a positive integer; A1 is the aromatic ring; X1' and X2' are independently selected from —SO$_2$, —CO; X3 and X4 are —O—, —NR, wherein R is a side chain independently selected from —H, —CO$_2$H, —(CH$_2$)nSO$_3$H, —(CH$_2$)nCO$_2$H or -tert-butyloxycarbonyl; Z1 to Z4 are independently selected from the hydrophilic group, the hydrophobic group or the amphiphilic group.

It is desirable that A1 is independently selected from a group consisting of phenyl, naphthyl, biphenyl (Φ—Φ; Φ=C$_6$H$_5$), benzophenone (Φ-CO-Φ), benzanylide (Φ-CONH-Φ), phenylether (Φ-O-Φ), phenylsulfide (Φ-S-Φ), phenylsulfone (Φ-SO$_2$-Φ) and phenylsulfoneamide (ΦSO$_2$NH-Φ). Also It is desirable that Z1 to Z4 include —H and at least one of that is a side chain which is getting 2~30 length comprising carbon (C), nitrogen (N), sulfur (S) or oxygen (O). Preferably, the side chain is selected from a group consisting of alkyl, akkenyl, alkynyl or laicyclic derivatives independently composed of —(CH$_2$)nCH$_3$, —O(CH2)nCH$_3$, —O(CH$_2$) nOCH$_3$, —(OCH$_2$CH$_2$)nOCH$_3$ (n is an integer 1 to 24). Particularly, a terminal end of the side chains contains sulfonic acid(—SO$_3$H), carboxylic acid (COOH), benzenesulfonic acid (—OC$_6$H$_4$SO$_3$H), benzenecarboxylic acid (—OC$_6$H$_4$COOH), azacrwonehter, carbazole, thiol (—SH), pyridinium, imidazol and benzimidazol.

It is desirable that M shown in General formula 2 is Li$^+$, Na$^+$, K$^+$, Cu$^{2+}$, Zn$^{2+}$, Cd$^{2+}$, Mg$^{2+}$, Pb$^{2+}$, Mn$^{2+}$, Fe$^{2+}$, Ca$^{2+}$, Fe$^{3+}$, Ti$^{4+}$ or Mn$^{7+}$ and that A2 shown in General formula 3 is phenyl, naphthal, biphenyl.

It is also desirable that the soluble self-orienting materials are linear copolymer selected from a group consisting of poly-para-phenylene terephthalate, poly-para-phenyleneterephthalamide, poly-2,6-naphthaleneterephthalate and poly-2,6-naphthaleneterephthalamide with a molar ratio of 1~30% and the materials have a number average molecular weight of 1,000~100,000.

In another aspect, the present invention also provides a conductive polymer composition comprising:
an electrically conductive polymer; and
a soluble self-orienting material of monomer form, as an additive material for enhancing electrical conductivity of the conductive polymer, which comprises 1~95 percent by weight based on the total composition and shown in General formula 1 below.

(1)

wherein p is a positive integer indicating hydrogen-bond form; A1 is an aromatic ring; X1 and X2 are functional groups which can be independently selected from a group consisting of —SO$_2$OH, —COOH, —CO2 and SO3; Z1 and Z2 are independently selected from the hydrophilic group, the hydrophobic group or the amphiphilic group.

In another aspect, the present invention provides a conductive polymer composition comprising:
an electrically conductive polymer; and
a soluble self-orienting material of metal-salt form, as an additive material for enhancing electrical conductivity of the conductive polymer, which comprises 1~95 percent by weight based on the total composition and shown in General formula 2 below.

(2)

wherein q is an integer of 1 or more; A1 is the aromatic ring; X1 and X2 are conjugate base of dibasic acid monomer which can be independently selected from —CO$_2$, —SO$_3$; Z1 and Z2 are independently selected from the hydrophilic group, the hydrophobic group or the amphiphilic group; M is alkali metal or transition metal of cation form.

In another aspect, the present invention provides a conductive polymer composition comprising:
an electrically conductive polymer; and
a soluble self-orienting material of whole aromatic polymer form, as an additive for enhancing electrical conductivity of the conductive polymer, which comprises 1~95 percent by weight based on the total composition and shown in General formula 3 below:

(3)

wherein r is an integer of 1 or more; A1 is the aromatic ring; X1' and X2' are independently selected from —SO$_2$, —CO; X3 and X4 are —O—, —NR, wherein R is side chain can be independently selected from —H, —CO$_2$H, —(CH$_2$)nSO$_3$H, —(CH$_2$)nCO$_2$H or -tert-butyloxycarbonyl; Z1 to Z4 are independently selected from the hydrophilic group, the hydrophobic group or the amphiphilic group.

It is desirable that the conductive polymers are independently selected from polyaniline, polypyrrole, polythiophene, polyacetylene, poly-para-phenylene, polyphenylenesulfide and polycarvazol.

Additional features and advantages of the present invention are described in, and will be apparent from, the detailed description of the presently preferred embodiments.

DETAILED DESCRIPTION OF THE INVENTION

The additives for a conductive polymer, with above objects, of the present invention contain a monomer induced with a flexible side chain having various polarities or hydrophilic dibasic acid to aromatic ring, a complex linked by hydrogen bond or metal coordinate bond among the monomer, or a whole aromatic polyamide or a polyester linked repeatedly with —NRCO—, —NROSO—(R is side chain including hydrogen), and —CO—. The monomer, complex, polyamide or polyester are linked to aromatic ring above, respectively.

The additives are based on rigid rod-form polymer self-assembled by hydrogen bond among hydrophilic functional groups or linked not only by metal coordinate bond but also by —NRCO—, —NROSO— or —OCO—. By inducing flexible long side chain into the aromatic ring of the polymers, it provides amphiphlicity and possibility of transforming of the conductive polymer with improved solubility and compatibility, as described in U.S. Pat. No. 5,470,505.

After substituting rigid backbone with normal alkyl group of less than 20 of carbon atoms as an flexible side chain, its mechanical, thermal and physical properties were initially investigated by Lenz et al. (Lenz; Eur. J. Polym. 19, p 1043, 1983) and developed by Ballauff (Ballauff et al, Angev. Chem. Int. Ed. Engl. 28, 253, 1989).

The present inventors discovered the following results. On substituting side chain (i.e. lengthy alkyl alike) to aromatic dibasic acid, the hydrophilic and/or hydrophobic functional groups in monomer had amphiphlicty and self-orientation to form intermediate phase like liquid crystal and have orders. Accordingly, inducing these monomers into conductive polymer, according to the present invention, can change the chain form structure of the polymer.

Based on the fact mentioned above and taking into account of interaction the conductive polymer, a soluble self-orienting materials (SOM), substituted with various types of side chains with a carbon number 6~30 independently/coordinately to the aromatic ring was synthesized. The SOM was made up of a monomer/polymer leading self-orientation and was able to be synthesized through a simple organic polymer reaction.

For example, an aromatic dibasic acid (General formula 1 below) monomer and its metal-salt (General formula 2 below) was produced from synthesizing a monomer through simple organic substitution reaction and then reacting between this acid and metal oxidized material/metal chlorinated material. And polymer (general formula 3 below) could be produced from a condensation reaction between carboxylic acid and 1,4-phenylendiamine or hydroquinone having substitution group.

(3)

wherein p, q, or r in General formulas 1, 2, 3, respectively, are positive integers; X1 and X2 in General formula 1 are independently selected from —SO$_2$OH or —COOH; X1 and X2 in general formula 2 are independently selected from —CO$_2$ or —SO$_3$. X and X2 in general formula 3 are independently selected from —O—, —NR—, R is independently selected from —H, —SO$_3$H, —COOH, —(CH$_2$)$_n$SO$_3$H, —(CH$_2$)$_n$COOH and tert-butyloxycarbonyl; A1 is an aromatic ring and independently selected from phenyl, naphthyl, biphenyl (Φ—Φ; Φ=C6H5), benzophenone (Φ-CO-Φ), benzanilide (Φ-CONH-Φ), phenylether (Φ-O-Φ), phenylsulfide (Φ-S-Φ), phenylsulfone (Φ-SO2-Φ), or phenylsulfoneamide (Φ-SO2NH-Φ); A2 in General formula 3 is a secondary aromatic ring independently selected from pure/sulfonated phenyl, naphthyl or biphenyl;

M in General formula 2 is an alkali or transitional metal cation, which can be independently selected from monovalent cation, particularly Li$^+$, Na$^+$ or K$^+$, or a small bivalent cation like Cu$^{2+}$, Zn$^{2+}$, Cd$^{2+}$, Mg$^{2+}$, Pb$^{2+}$, Mn$^{2+}$, Fe$^{2+}$ or Ca$^{2+}$. Also it can be Fe$^{3+}$, Ti$^{4+}$, Zr$^{4+}$ or Mn$^{7+}$; and Z1 and Z2 in General formula 1, 2, or 3 and Z3 and Z4 in General formula 3 above are independently selected from two types of side chain below.

The first side chain is a group inducing stable doping and the second side chain is a group having affinity with cation or helping movement of charges.

More specifically, substituted groups Z1, Z2, Z3, and Z4 are independently selected and at least one of them contains carbon (C) or nitrogen (N), sulfur (S) and oxygen (O) as a hetero atom. Preferably the groups contain a side chain of alkyl, alkenyl, alkynyl, or alicyclic derivatives such as norbonene comprising one of —(CH$_2$)$_n$CH$_3$, —O(CH$_2$)$_n$CH$_3$, —O(CH$_2$)$_n$CH$_3$, and —O(CH$_2$CH$_2$)$_n$OCH$_3$ (n is an integer 1~24) with a total length of the side chain of 2~30, preferably 6~24.

Also, terminal end of Z1, Z2, Z3 and Z4 may be selected from the side chains attached to sulfonic acid (—SO3H), carboxylic acid(—COOH), and benzenesulfonic acid(—OC6H4SO3H) or azacrown ether, carbazole, thiol (—SH), pyridinium, imidazol, and benzimidazol, which have 6~24 aromatic rings, for stable doping or affinity with cation and charge movement. Especially, self-orienting material attaching pyridinium, imidazol, and benzimidazol to the terminal end of the side chain is multi-functional material with a function of a gel-inhibitor, for transferring of stable cation and dopant and also designed for enhancing electrical conductivity and compatibility.

According to the present invention, upon inducing carboxylic group or sulfonic acidic group along with the flexible matrix side chain such as simple alkyl into the rigid aromatic ring, these molecules generally are self-assembled and oriented to form order in a definite concentration resulted from amphiphilicity.

In the polymer described by General formula 3, it is desirable that the carboxylic group or the sulfonic acidic group contained in the side chain is in the range of 1~15% by weight based on the total polymer weight and have a number average molecular weight of 4,000~100,000.

Not only can the SOM of the polymer function be a self-orienting material, it also can be a dopant simultaneously by inducing carboxylic group or sulfonic acidic group into it, thus it can blend with the conductive polymer without another dopants.

Also, if the cross-section of a hydrophilic molecule and of an alkyl group in the amphiphilic molecule is almost the same, a layered structure is stabilized and the SOM functions as a surfactant. As a result, the problem of insolubility and unprocessability caused by rigid chain form of the conductive polymer can be solved, as well as electrical conductivity by inducing chain straightly can be improved, by applying the SOM to the conductive polymer and extending the concept of a liquid crystalline phase or a crystalline phase with layer.

For example, if whole aromatic polyamide, which is insoluble and unmeltable, is substituted with two types of flexible matrix side chains above to its benzenic ring, it can be soluble in organic solvents such as 1-methyl-2-pyrrolydinon, 1,1,2,2,-tetrachloroethane, chloroform, and meta-cresol, form liquid crystalline phase, and meltable as a result of increasing thermal fluidity.

Accordingly, a polyamide polymer as the SOM of the present invention, which is a rigid polymer of an aromatic backbone structure linked repeatedly with —NRCO— and —NROSO— between 2 benzene ring substituted by long side chains, unlike polyparaphenylene terephthalamide (U.S. Pat. No. 5,470,505; U.S. Pat. No. 5,882,566) without side chain, is a polymer material having an advantage showing thermal melting behavior because it can be solved well in ordinary organic solvents.

The polyamide polymer of the present invention, with relatively relieved interaction such as an intermolecular hydrogen bond by a self-orient effect of the side chain, has a property to increase an interaction like the hydrogen bond with the conductive polymer. So, it has increasing compatibility and prevents gelation by the hydrogen bond between polyaniline molecules. As a result, it has advantage of decreasing preparation procedure and cost because other additives such as gel inhibitor are not needed for processing.

The SOM above has an ultimate object of maximum electrical conductivity in contained quantity by designing the length of type of the side chain in the aromatic backbone properly and increasing solubility and compatibility, said backbone can be changed a bit. It is possible that both the polymer linked only to para-position with an at least long side chains and a terpolymer comprising 1~30% molar ratio of an unbranched monomer such as para-phenylenediamine, terephthaloylchloride, or 2,6-naphtoylchlride are alike Soluble self-orienting polymers.

These terpolymers refer to a linear polymer which links benzene rings as a monomeric unit at only para position or refers to a linear-curved copolymer which links benzene rings at meta or ortho position together with para position. It is well known that melting processibility, solubility and the like of these linear-curved copolymers increase generally unlike those of the linear copolymers, which link only para position. The present invention also contains a composition comprising the linear polymer linked monomeric units at only para position and with the linear-curved copolymer in order to optimize process procedure although the copolymer makes electrical conductivity low.

Electrically conductive polymer according to the present invention suitable for enhancing electrical conductivity contains polyaniline, polypyrrole, polythiophene, polyacetylene, poly-para-phenylene, polyphenylenesulfide, polycarbazole alike, especially in doping the conductive polymer of the present invention by a proton such as polyaniline, polypyrrole, polythiophene even without other dopants. By inducing the SOM of the present invention, the electrical conductivity of the conductive polymer by inducing chain form of dopant and of the conductive polymer can be increased linearly. Also, because the SOM can enhance solubility, it can apply to any reformed conductive polymer, such as conductive polymer with substitution group or other additives.

Although it is desirable that SOM in molecular weight or in quantity used regularly up to property or use of conductive polymer, it has self-orienting property as mentioned above and it has no limited molecular weight, it can be 1~99% in quantity.

But, in the SOM of polymeric form, as mentioned above in general formula 3, its interaction with the conductive polymer has an important meaning in molecular weight or distribution of molecular weight because terminal end of aromatic backbone is primary amines or carboxylic acid.

For example, in case the number average molecular weight of the conductive polymer is less than 5000, and enhancing processability and physical property resulted from increasing molecular weight of the SOM by more than 0.2 g/dL of intrinsic viscosity, the effect of terminal end decreases relatively. But in case the number average molecular weight of conductive polymer is over 10,000, still more than 30, 000 in range of allowable mechanical, physical properties, we can lower molecular weight or contained quantity of the SOM above. In this case, the role of terminal end is relatively large. But, to maximize electrical conductivity, it is desirable that we raise contained quantity of the SOM by more than 50%, preferably by more than 85%, by using various types of SOM respectively.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

We will explain in detail the SOM and processing method of its composition of the present invention through a desirable example.

To begin, a method to measure electrical conductivity and a method to process by synthesizing polyaniline into emeraldine base as a conductive polymer are described.

<Method to Measure Electrical Conductivity>

Electrical conductivity is measured by a four-line probe method in room temperature with a relative humidity 50%. We used carbon paste for contacting gold wired electrode, and measured electrical current, two external electrodes, and voltage from filmic sample (thickness: t, width: w) with a thickness of 1~10 μm, and electrical conductivity with regard to distance (1) between two internal electrode with Keithley conductivity measurement apparatus. Electrical conductivity was calculated by the formula below, and units of electrical conductivity are in Siemen/cm or S/cm.

Electrical Conductivity=$(l \times i)/(w \times t \times v)$

We measured by Van der Pauw method, which is a standard four point probe, for certifying equality of electrical conductivity in samples, but they matched within 5% in result.

<Process for Synthesizing Polyaniline Emeraldine Base>

Polyaniline emeraldine base was synthesized by Mcdiarmid method (Mcdiarmid et al; conducting Polymer Ed. by Alcacer, Dordrecht, 105, 1987).

At first, distilled purifying aniline 10 ml and 1M HCl solution 600 ml was placed into a 3-necked flask, solution of ammonium peroxidesulfate $((NH_4)_2S_2O_8)$ 5.6 g dissolved in 1M HCl 200 ml was added at −5° C. for 15 minutes with stirring the solution slowly. 2 hours later, after filtering the obtained precipitate with filter paper, it was washed by 1M $NH_4OH$ solution 100 ml. After the precipitate was transferred to 0.1 M NH4OH solution 500 ml, stirred for 20 hours and filtered, the precipitate was dried with vacuum pump for 48 hours and the polyamide emeraldine base 1.5 g was yielded.

EXAMPLES 1a TO 1d

Examples 1a to 1d illustrate the process for synthesizing polyalkyl azacrown ether amide (hereinafter referred to as PACA).

i) Example 1a

Example 1a is with regard to a step for synthesizing the primary PACA precursor. After dissolving diethylterephthalate(DEDHT) 5 g ($2.1 \times 10^{-2}$ mol) in dimethylformamide (solvent) 100 ml, K2CO3 base 11.6 g (8.4×10-2 mol) was added and stirred in the solution for 30 minutes. Prepared 1,10-dibromodecane 28 g (8.4×10-2 mol)/tetrahydrofuran (hereinafter referred to as THF) solution was added into the solution at 25° C. for 1 hour. Then the said mixture was reacted for 48 hours to form a crude primary PACA precursor. The precursor was separated and purified with column chromatography to obtain a pure primary PACA precursor 10.8 g (70% yield).

ii) Example 1b

Example 1b is with regard to a step for synthesizing the secondary PACA precursor. After dissolving the primary PACA precursor 1.0 g (1.4×10-2 mol) obtained in example 1a in THT solvent 100 ml, 1,8-diazabicyclo (5.4.0) undec-7-ene (hereinafter referred to as DBU) base 0.8 g (5.4×10-2 mol) was added. Prepared 1-aza-15-crown-5 0.6 g (2.7×10-3 mol)/THF solution was added into the solution at 25° C. for 2 hours. Then the said mixture was reacted for 48 hours to form a crude secondary PACA precursor. The precursor was separated and purified with column chromatography to obtain the pure secondary PACA precursor 1.0 g (75% yield).

iii) Example 1c

Example 1c is with regard to a step for synthesizing the tertiary PACA precursor.

After dissolving the secondary PACA precursor 1.0 g (9.9×10-4 mol) in 0.5 M ethanol solvent 200 ml, the solution was reacted at 25° C. for 12 hrs. After titrating hydrolysed solution with 1M HCl to adjust into weak acid, the crude tertiary PACA precursor was formed, separated and purified with column chromatography to synthesize the pure tertiary PACA precursor 0.8 g (82% yield).

iv) Example 1d

Example 1d is a step completing PACA polymer.

In ice bath, pyridine 23 ml (3.0×10−1 mol) was added into chlorothionyl (SOCl2) 1.16 ml (6.0×10−3 mol) and the mixture was stirred for 30 minutes. After dissolving the tertiary PACA precursor obtained in above Example 1c in pyridine 10 ml and adding into the solution, the mixture was stirred at room temperature for 30 minutes. The reaction solution was added into excessive methanol to precipitate and after washing it three times with water and methanol and drying in vacuum, the PACA polymer 0.75 g (90% yield) was produced.

The above polymer had intrinsic viscosity of 0.2 g/dL. As a result of an analysis with an infrared spectroscope, it showed a typical amide and C—O absorbance band at 1650 cm−1, 1300 cm−1, and 1120 cm−1.

The reaction mechanism of the above Examples 1a through 1d by steps is shown in Reaction 1 below.

[Reaction 1]

EXAMPLE 2

Example 2 is with regard to a process for synthesizing polyoligoetoxyazacrownetheramide (hereinafter referred to as POCA), which is one of said SOM of the present invention.

The POCA precursor was synthesized by substituting tosyl group for hydroxy group of triethyleneglycol in the presence of pyridine/THF solvent. The POCA polymer was synthesized through various steps with the same process as Example 1. The reaction mechanism is Reaction 2 below.

EXAMPLE 3

Example 3 is with regard to a process for synthesizing polyalkylcarbazoleamide (PCA).

The PCA precursor was synthesized with the same process as Example 1a and the precursor reacted carbazole in the presence of DBU/THF to induce carbazole into the terminal end of the side chain. After hydrolyzing the precursor with the same process as the Examples 1a through 1d, it was polymerized to form the PCA polymer.

The said polymer had intrinsic viscosity of 0.3 g/dL. Aanalysis with an infrared spectroscope showed it to have a typical amide and aromatic absorbance band at 1660 cm−1 and 1600 cm−1. Thermal analysis showed it to have a glass transition point of 160° C. and to stabilize thermally below 400° C.

The reaction mechanism in this example 3 is represented by Reaction 3 below.

EXAMPLE 4

Example 4 is with regard to a process for synthesizing polyoligoethoxyamidecarbazole (POAC).

The POAC precursor was synthesized by substituting tosyl group for hydroxy group of triethyleneglycol with the same process as Example 2 and the POAC polymer was synthesized through various steps with the same process as Example 3. The reaction mechanism is represented by Reaction 4 below.

EXAMPLE 5a

Example 5a is with regard to the SOM material inducing pyridinium into the terminal end of the side chain of it. With the same procedure as Reaction 1, after refluxing the primary precursor and pyridine compound in the presence of THF solvent for 12 hours and inducing the compound with pyridinium the compound was hydrolyzed to obtain a final product.

EXAMPLE 5b

Example 5b is with regard to the SOM material inducing imidazole group into the terminal end of the side chain of it. With the same procedure as Reaction 1, imidazole compound (0.1 mol) was dissolved in THF solvent and NaOH (0.15 mol) was added into the solution. 30 minutes later, the primary precursor was added into the solution to make the solution refluxed for 6 hrs. The product resulting from the reaction was isolated with column chromatography and hydrolyzed to obtain the final product.

The reaction mechanism for Example 5a to 5b is represented by Reaction 5 below.

EXAMPLE 6a

Example 6a is with regard to a process for synthesizing carboxylic acid monomer and polyalkylamide (PAA).

The carboxylic acid monomer is the SOM material of the present invention composed of 12 carbons with carboxylic acid as a substitution group at para-position. The polyalkylamide is the SOM material of polymeric form.

With the same procedure as the above Example 1a, After dissolving diethyl-2,5-dihydroxyterephthalate (DEDHT) 5 g (0.02 mol) in THF solvent 100 ml, K2CO3 base 8.168 g (0.06 mol) was added and the mixture was stirred for 30 minutes.

Solution of 1-bromodecane 10.792 g (0.043 mol) dissolved in THF solvent was added into the solution at 25° C. for 1 hour. After obtaining carboxylic acid precursor produced from reaction for 24 hours, the precursor was hydrolyzed with the same procedure as Example 2 to synthesize carboxylic acid and PAA.

The polymer had intrinsic viscosity of 2.0 g/dL. Analysis with an infrared spectroscope showed it to have a typical amide and aliphatic absorbance band at 2,900 and 1650 cm−1. Thermal analysis showed it to have a glass transition point of 140° C. and to stabilize thermally below 260° C. The reaction mechanism is represented by Reaction 6.

EXAMPLE 6b

Example 6b is with regard to the SOM material with a metal complex form of the carboxylic acid monomer produced as shown above in Reaction 6. A bivalent cation such as Ca2+ or Mg2+ can be used for synthesizing the metal complex. After heating Ca (OAC) 2 0.1 mol in NMP solvent to dissolve it and hydrolyzed carboxylic acid monomer was added into the solution, the mixture was reacted at 100° C. for 5 hours to produce the metal complex product. Thermal analysis showed it to stabilize below 260° C. and to have a glass transition point of 138°C.

EXAMPLES 7a, 7b

Examples 7a and 7b are with regard to a process for synthesizing bis-dodecyloxybenzene sufonic acid (hereinafter referred to as bissulfonic acid) monomer. The bissulfonic acid monomer is the SOM material of the present invention composed of 12 carbons with the sulfonic acid group as a substitution group at para-position.

The process for synthesizing the bissulfonic acid monomer is represented briefly in the above Reaction 6, and a more detailed synthesis process is explained in Examples 7a and 7b.

EXAMPLE 7a

Example 7a is with regard to a step for synthesizing bissulfonic acid precursor.

After dissolving hydroquinone 11 g (0.1 mol) in DMF solvent 100 ml, K2CO3 base 7.6 g (0.3 mol) was added and the mixture was stirred for 30 minutes. Prepared 1-bromodecane 75 g (0.3 mol)/DMF solution was added into the solution at 55° C. for 1 hour. Crude bissulfonic acid precursor produced by reacting the solution for 24 hours was isolated and purified with column chromatography to produce the pure bissulfonic acid precursor 34.7 g (74% yield).

EXAMPLE 7b

Example 7b is with regard to a step for completing the synthesis of a bissulfonic acid monomer of the present invention.

After dissolving the bissulfonic acid precursor 22 g (0.05 mol) produced in the above Example 6a in dichloromethane solvent 220 ml, chlorosulfonic acid 11.6 g (0.1 mol) was added into this solution slowly at 0° C. for an hour. Bissulfonic acid produced by reacting the mixture for 24 hours was precipitated in hexane solvent, filtrated and washed with chloroform solvent. The obtained precipitate was dry-vacuumed to form the bissulfonic acid monomer 7 g (20% yield). The reaction mechanism is represented in Reaction 7 below.

[Reaction 7]

EXAMPLES 8a TO 8c

Examples 8a to 8c are with regard to a process for synthesizing polyphenoxyalkylamide sulfonic acid (PPASA). The synthesis process for PPASA is represented briefly in Reaction 8 below and is explained in detail by steps of Examples 8a through 8c.

[Reaction 8]

i) Example 8a

Example 8a is with regard to a step for synthesizing the primary PPASA precursor.

After dissolving phenol 10 g (0.1 mol) in THF solvent 100 ml, K2CO3 5.1 g (0.2 mol) was added and the mixture was stirred for 30 minutes. Prepared 1,10-dibromodecane 63.8 g (0.2 mol)/THF solution was added into the mixture at 25° C. for 1 hour. After reaction for 24 hours, produced crude primary PPASA precursor was isolated and purified with column chromatography to obtain the pure primary precursor 40 g (68% yield).

ii) Example 8b

Example 8b is with regard to a step for synthesizing the secondary PPASA precursor.

After dissolving diethyl-2,5-dihydroxyterephthalte (DEDHT) 5 g (0.02 mol) in dimethylformamide solvent 100 ml, K2CO3 8.168 g (0.06 mol) was added and the mixture was stirred for 30 minutes. The solution 50 ml of PPASA primary precursor 13.578 g (0.043 mol) obtained in the above Example 7a/dimethylformamide was added slowly into the mixture at 25° C. for 10 minutes. After reaction for 24 hours, produced crude secondary PPASA precursor was isolated and purified with column chromatography to obtain the pure secondary PPASA precursor 10 g (75% yield).

iii) Example 8c

Example 8c is with regard to a step for completing PPASA polymers and comprising steps for synthesizing the tertiary and quaternary PPASA precursor as in the prior step.

The PPASA precursor synthesized through the above Example 8b was hydrolyzed with the same procedure as in Examples 1c and 1d, and the polymer was obtained from polymerization. After dissolving the polymer in tetrachloroethane solvent, the PPASA was synthesized through sulfonation in the presence of chlorosulfonic acid and sulfuric acid. Sulfonation can be regulated to 1–15 percent by weight per gross weight of the PPASA polymer in accordance with reaction period and molar number adjustment of chlorosulfonic acid and sulfuric acid. The polymer has a intrinsic viscosity of 2.5 g/dL. Analysis with an infrared spectroscope showed it to have a typical amide, benzene and S—O absorbance band at 1650, 1600, 1520, 1350, and 1100 cm−1. Thermal analysis showed it to have a glass transition point of 170° C. and stabilize thermally below 400° C.

EXAMPLE 9

Example 9 is with regard to manufacturing of a composition comprising of carboxylic acid monomer produced in the above Example 6a and polyaniline and with regard to thin-film manufacturing.

After dissolving polyaniline 1 g and carboxylic acid monomer in meta-crezol/chloroform (weight ratio 1:1) mixed-solvent and filtrating the solution with 0.2 μm inject filter, the filtrate was placed on the optical slide glass for spinning. After doping three thin-films, using spin rates of 1000, 3000 and 5000 rpm respectively, with a thickness of about 1 μm in HCl 1M solution, the films were vacuum-dried. The vacuum-dried samples had electrical conductivity of 72 S/cm, 89 S/cm and 94 S/cm respectively. A simply casted sample, for comparison, had electrical conductivity of 14 S/cm. It seems that electrical conductivity enhances in proportion to rate owing due to self-orientation of the polymer. In the same conditions, a sample, which is doped with emeraldine salt without adding SOM with hydrochloride, had electrical conductivity of 1.6 S/cm in the range of the above spinning rates, with the reduced value a little bit in proportion to the increasing rate. Thus, after increasing SOM by only 50% by weight, electrical conductivity increased 50 times, according to the present invention.

EXAMPLE 10

Example 10 is with regard to manufacturing of the secondary polyaniline-SOM composition and with regard to thin-film manufacturing.

After dissolving polyaniline 1.0 g, PAA 0.1 g synthesized in the above Example 5 and bis-sulfonic acid 0.15 g synthesized in the above Examples 6a and 6b in meta-cresol/chloroform (weight ratio 1:1), mixing the solvent and filtrating the solution with 0.2 μm filter, the filtrate was applied with spinning into optical slide glass at 3,000 rpm. Manufactured film had electrical conductivity of 1,240 S/cm. The film showed absorbance at 800–1300 nm with a near-infrared spectroscope, which identified an active transition between polaron and bipolaron bands.

Figure 1A:
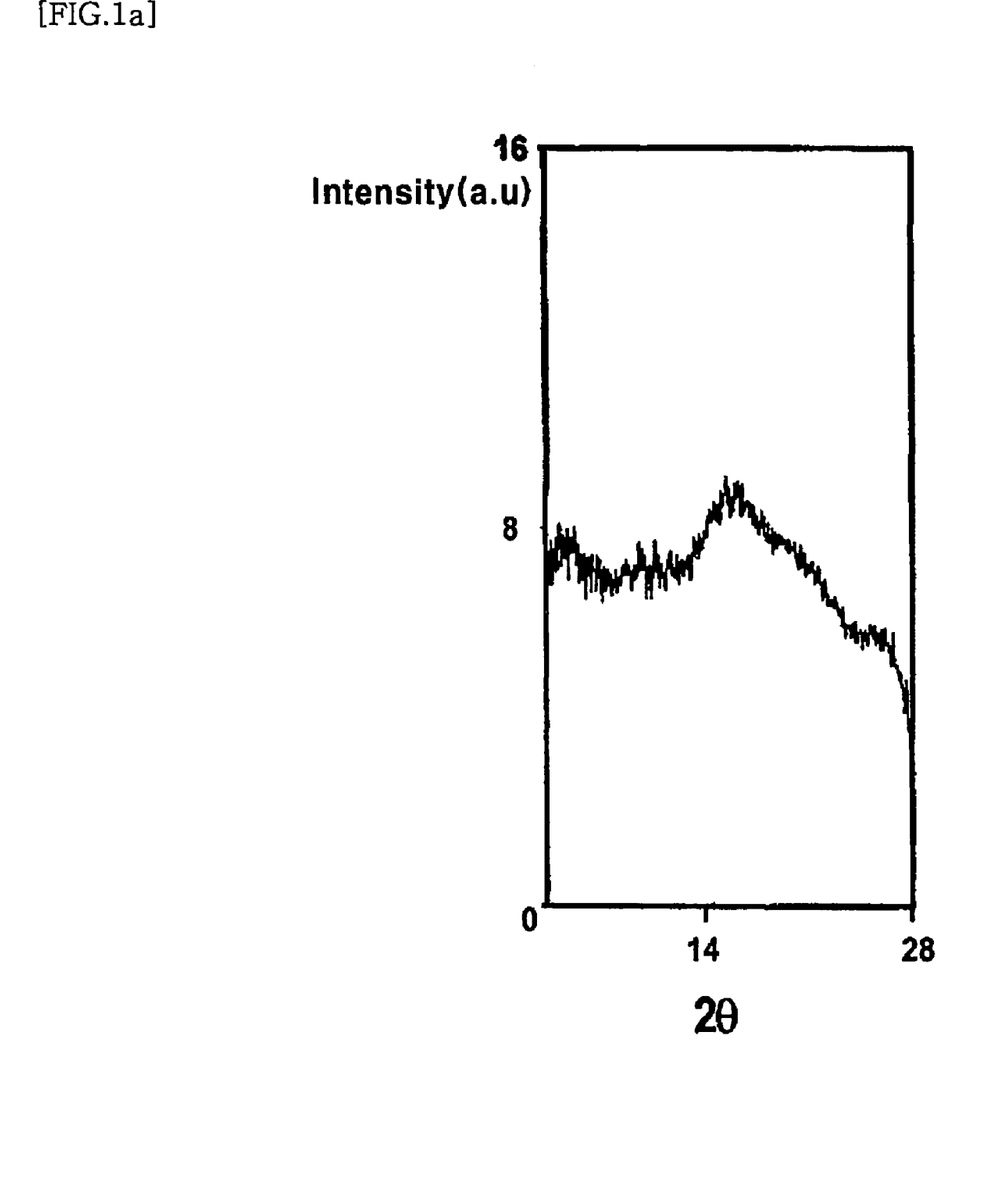
FIG. 1a is a graph showing X-ray diffraction pattern of a existing conductive polymer.
Figure 1B:
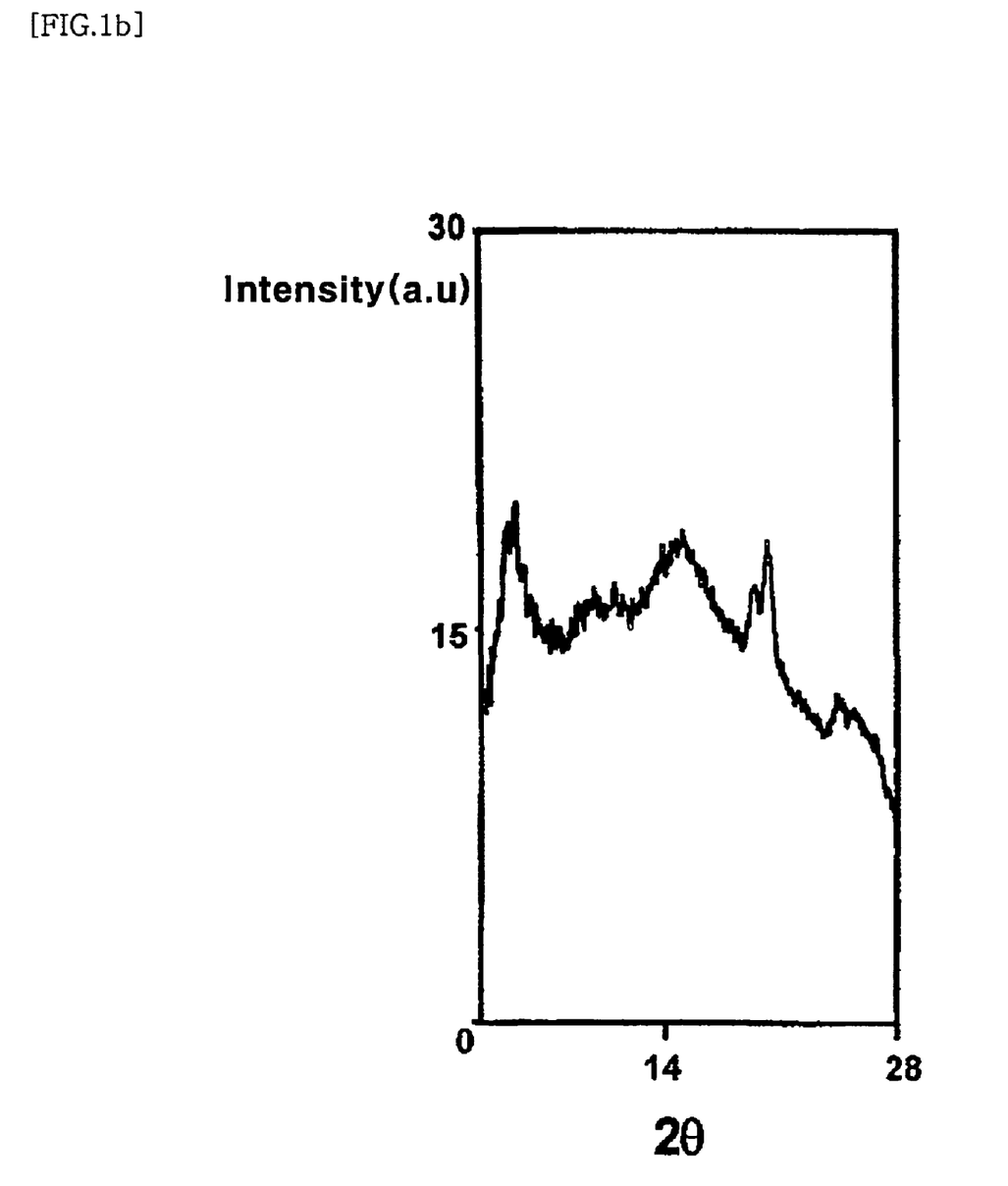
FIG. 1b is a graph showing X-ray diffraction pattern of an conductive polymer composition comprising soluble self-orienting material.

Hereinafter, we explain the property of crystallization degree for the polyaniline-SOM composition referring to an X-ray diffraction figure.

FIGS. 1a and 1b show an X-ray diffraction diagram for a prior conductive polymer and for a conductive polymer composition containing the soluble self-orienting material of the present invention (hereinafter abbreviated as conductive polymer composition) respectively, wherein the soluble self-orienting material is the PAA and bissulfonic acid monomer of the above Example 9.

FIG. 1a shows an X-ray diffraction peak for doping the prior polyaniline emeraldine salt with 1M solution of hydrochloride in the absence of particular self-orienting materials.

FIG. 1b shows an X-ray diffraction peak for conductive polymer composition mixed with polyaniline emeraldine salt and soluble self-orienting material of the present invention with a ratio of 85:15. On comparing FIG. 1b to FIG. 1a, FIG. 1b shows increasing diffraction peak in the incineration range between 2 and 14 degrees. It is further confirmed that the composition of FIG. 1b has higher electrical conductivity resulted from adding the above soluble self-orienting material.

Also, the conductive polymer composition of the present invention exhibits high crystallinity of 40–50% crystallization (crystallization excluding orientation effect) seen from the X-ray diffraction diagram in FIG. 1b.

EXAMPLE 11

Example 11 is with regard to another example for manufacturing of the secondary polyaniline-SOM composition and with regard to thin-film manufacturing.

After dissolving polyaniline 0.8 g and imidazole derivative 0.2 g synthesized in the above Example 5 in meta-cresol/chloroform (weight ratio 4:1), mixing solvent and filtrating solution doped with camphorsulfonic acid with 0.2 μm inject filter, the filtrate was applied with spinning into optical slide glass at 3,000 rpm. The film showed absorbance at 800–1300 nm with the near-infrared spectroscope, which identified an active transition between polaron and bipolaron bands.

Hereinafter, we explain the property of crystallization degree for the polyaniline-SOM composition referring to an X-ray diffraction figure.

FIGS. 1a and 1b show an X-ray diffraction diagram for a prior conductive polymer and for a conductive polymer composition containing the soluble self-orienting material of the present invention (hereinafter abbreviated as conductive polymer composition) respectively.

FIG. 1a shows an X-ray diffraction peak for doping the prior polyaniline emeraldine salt with camphorsulfonic acid in the absence of particular self-orienting materials.

FIG. 1b shows an X-ray diffraction peak for conductive polymer composition mixed with polyaniline emeraldine salt and soluble self-orienting material of the present invention with a ratio of 80:20. On comparing FIG. 1b to FIG. 1a, FIG. 2b shows increasing diffraction peak in the incineration range between 2 and 14 degrees. It is further confirmed that the composition of FIG. 1b has higher electrical conductivity resulted from adding the above soluble self-orienting material.

Also, the conductive polymer composition of the present invention exhibits high crystallinity of 46–51% crystallization (crystallization excluding orientation effect) seen from the X-ray diffraction diagram in FIG. 2b.

EXAMPLE 12

Example 12 is with regard to manufacturing of PPASA composition produced from Example 8a to 8c and to thin-film manufacturing.

The self-dopable film, produced from polyaniline 2 g and PPASA 1 g with the same procedure as in Examples 8a to 8c, had an electrical conductivity of 2.1×10−2, 5.1×10−3 and 4.4×10−3 S/cm at spinning rate of 1000, 3000 and 5000 rpm respectively. Electrical conductivity was reduced with increasing spin rate and the conductivity was relatively low due to insufficient doping. On the other hand, the sample processed with spinning for polyaniline 1 g and PPASA 0.8 g at 1,000 rpm showed an electrical conductivity of 0.3 S/cm.

Also after doping the same sample with bissulfonic acid using the above Example 7a and 7b, electrical conductivity of it increased to 38 S/cm.

EXAMPLE 13

Example 13 is with regard to manufacturing of the tertiary polyaniline-SOM composition and to thin-film manufacturing.

After heating polyaniline 1 g and PAA 2 g synthesized from the Example 6a in 1-methyl-2-pyrrolidinone(weight ratio 1:1) and mixing solvent to dissolve it, the solution was filtrated with Whatman #2 filter paper to make the solution concentrate to 15%. Then the solution was treated with a jetting method, which is scattering water and ethanol with a ratio of 3:1 with injection syringe (needle gauge 20), to manufacture monofilament.

Prepared coagulation bath was adjusted to 40° C. and tip of the injection syringe was fixed into the solution of the bath. These blue fibers were doped with 1M HCl solution and vacuum-dried for 48 hours. The doping material has an electrical conductivity of 45 S/cm with a method of 2 point probe. On the other hand, after inducting the SOM in the form of 0.5M carboxylic acid or sulfonic acid monomer as dopnats, the electrical conductivity was 140 S/cm.

EXAMPLE 14

Example 14 is with regard to manufacturing of the quaternary polyaniline-SOM composition and to thin-film manufacturing.

Into a 500 ml, 3-necked flask was placed the solution dissolved in ethanol 200 ml and was stirred. The solution was neutralized with $Ca(CO)_3$ 0.5 g. After mixing polyaniline 4 g and PAA 4 g into the neutralized solution with the same procedure as Example 9, the mixture was precipitated and filtered to obtain a filter cake. After drying the filter cake 8 g and nylon 6 (Toplomid 1011R, Hyosung T&C) 12 g at 80° C. for 24 hours, they were mixed at 240° C., 50 rpm using the Haake Mixer. This mixture was compressed at 235° C. to manufacture the sheet sample with a thickness of 10 μm. These samples had tensile strength of 70 MPa and electrical conductivity of 0.2 S/cm after doping them with 0.5M carboxylic acid and sulfonic acid monomer.

Besides, the electrical conductivity of the sample of polyaniline emeraldine salt with 1M hydrochloride solution in the absence of particular additives with that of the sample of the film form of the polyaniline composition mixing conductive polymers, which with the induced SOM of a monomer according to the present invention, and with polyaniline of 15% by weight were 2 S/cm and 1,240 S/cm respectively, that is 620-fold. However, if the contents of polyaniline were less than 15% by weight, the polymers had lower electrical conductivity than pure polyaniline emeraldine salt. It means that the SOM is closely connected with adjusting of a composition ratio of polyaniline.

Accordingly it is possible for the composition of the present invention, which is mixed with SOM and a conductive polymer, to have the electrical conductivity of $10^{-8}$~$10^3$ S/cm in accordance with contents of the conductive polymer.

That is, the conductive polymer composition containing the SOM of the present invention make SOM occupy 1–95% by weight, desirably 5–85% and more desirably 15–70%, and maintain the range of the above conductivity.

The conductive polymer composition containing SOM of the present invention through above Examples have a function as a dopant and self-orienting promoter. But the present invention is not limited to the above Examples and may be applied to other forms without departing from the essential characteristics thereof.

The conductive polymer composition consisting of the SOM of the present invention can be applied to processing of films, fibers, coatings and the like by precipitating a solution-state composition into other liquids such as water and by vaporizing solvents of the solution using a processing apparatus. Also, the conductive polymer can be processed in the mater-batch form in a solution state or a melting state responding without or with the second polymer using extruder, injector, or Brabender. Because electrical conductivity of the processed polymer is increased by spinning rate of screws resulted from properties of self-orientation and the like of the SOM, those properties can be used effectively only if the most suitable conditions are satisfied.

Various metals can be used with used polymers and solvents depending on temperature and composition of polymers. For example, the SOM containing Zn can be used without any difficulties owing to melting over typical processing temperature of 220° C. and the SOM containing Ca is not dissolved over 270° C., but it can be used because it is dissolved in a mixed solvent such as hydriquinone and so forth.

Particularly, on coating the composition into steel, Ni, Al, Cu, Zn, Co, Pb, No, Nb, Ag, Ta, Ti, Zr or alloy of steel for anti-corrosion, that dopants have an anti-corrosive effect resulting from the passivating anodic sites of acids attached to side chain of the composition.

INDUSTRIAL APPLICABILITY

As mentioned above, the conductive polymer inducing SOM of the present invention has higher electrical conductivity, up to $10^3$ S/cm, significantly higher than that of conventional conductive polymers and has excellent processibity. So it can be used to all sorts of conductive film, fiber, coatings, polymer blending, battery electrode or organic semiconductor. And the composition has high electrical conductivity notwithstanding low contents of conductive polymers. So it is suitable for the particular use such as transparent electrode, anti-corrosion, near-infrared light absorption, conductive etch mask layer and so forth.

The SOM comprises aliphatic compounds, which are self-assembled to thin film by langmuir-blogett molecular assembly as mixed agent of conductive polymer in addition to interfacial active agent. After being self-assembled, it can be applied to opto-electronic materials according to the pattern of the side chains too.

Besides, the SOM has high interfacial adhesion and fusibility and as a result it can be adapted to various products made by general processing for thermoplastic resins such as a template for making a model of nano-particle inorganic materials or fiber, film and coatings requiring conductivity.

What is claimed is:

1. A soluble self-orienting material of metal-salt form, as an additive for enhancing electrical conductivity of a conductive polymer, comprising a repeat unit of General formula 2 below:

wherein q is an integer of 2 or more; A1 is an aromatic ring; X1 and X2 are conjugate base of dibasic acid monomers which can be independently selected from —$CO_2$; and Each Z1 and Z2 is a side chain selected from a group consisting of alkyl, alkenyl, alkynyl and alicyclic derivatives which is selected from a group consisting of —$(CH_2)_n CH_3$, —$O(CH_2)_n CH_3$ and —$O(CH_2CH_2)_n OCH_3$, wherein n is an integer 1 to 24; M is an alkali metal or a transition metal of cation form.

2. The soluble self-orienting material according to claim 1, wherein M is selected from a group consisting of $Li^+$, $Na^+$, $K^+$, $Cu^{2+}$, $Zn^{2+}$, $Cd^{2+}$, $Mg^{2+}$, $Pb^{2+}$, $Mn^{2+}$, $Fe^{2+}$, $Ca^{2+}$, $Fe^{3+}$, $Ti^{4+}$, $Zr^{4+}$ or $Mn^{7+}$.

3. An electrically conductive polymer composition comprising:

an electrically conductive polymer; and
a soluble self-orienting material of metal-salt form, as an additive material for enhancing electrical conductivity of the conductive polymer, which occupies 1 to 95 percent by weight based on the total composition and comprises a repeat unit of General formula 2 below:

wherein q is an integer of 2 or more; A1 is an aromatic ring; X1 and X2 are conjugate base of dibasic acid monomers which can be independently selected from —$CO_2$; and Each Z1 and Z2 is a side chain selected from a group consisting of alkyl, alkenyl, alkynyl and alicyclic derivatives which is selected from a group consisting of —$(CH_2)_n CH_3$, —$O(CH_2)_n CH_3$ and —$O(CH_2CH_2)_n OCH_3$, wherein n is an integer 1 to 24; M is an alkali metal or a transition metal of cation form.

4. The soluble-self-orienting material according to claim 1, wherein the aromatic ring A1 is selected from a group consisting of phenyl, naphthyl, biphenyl (Φ—Φ; Φ=C6H5), benzophenone (Φ-CO-Φ) benzanilide (Φ-CONH-Φ), phenylether (Φ-O-Φ), phenylsulfide (Φ-S-Φ), phenylsulfone (Φ-SO2-Φ) or phenylsulfoneamide (Φ-SO2NH-Φ).

5. The soluble self-orienting material according to claim 1, wherein at least one of the Z1 to Z2 has the side chain with a length of 2–30, containing carbon, nitrogen or oxygen.

6. The soluble self-orienting material according to claim 1, wherein the side chain comprises the alkyl derivatives selected from a group consisting of —O(CH$_2$)$_n$CH$_3$, or —O(CH$_2$CH$_2$)nOCH$_3$, wherein n is an integer 2 to 11.

7. The soluble self-orienting material according to claim 1, wherein said side chain has a substituted terminal end selected from a group consisting of sulfonic acid (—SO$_3$H), carboxylic acid (COOH), benzesulfonic acid (—OC$_6$H$_4$SO$_3$H), benzenecarboxylic acid (—OC$_6$H$_4$COOH), -azacrownether, -carbazole, thiol (—SH), pyridinium, imidazol and benzimidazol.

8. The electrically conductive polymer composition according to claim 3, wherein the polymer is selected from a group consisting of polyaniline, polypyrrole, polythiophene, polyacetylene, poly-para-phenylene, polyphenylenesulfide or polycarbazole.

9. The electrically conductive polymer composition according to claim 3, wherein the soluble self-orienting material is a surface active additive for polymerization of a corresponding monomer, wherein the monomer is selected from a group consisting of aniline, pyrrole, and thiophene.

* * * * *

UNITED STATES PATENT AND TRADEMARK OFFICE
CERTIFICATE OF CORRECTION

| | | |
|---|---|---|
| PATENT NO. | : 7,064,178 B2 | Page 1 of 1 |
| APPLICATION NO. | : 10/472334 | |
| DATED | : June 20, 2006 | |
| INVENTOR(S) | : Suck-Hyan Lee and Chan-Woo Lee | |

It is certified that error appears in the above-identified patent and that said Letters Patent is hereby corrected as shown below:

In column 3, line 43 after "group" ")" should be deleted.

In column 13, line 63 "Aanalysis" should be --Analysis--.

In column 24, line 34 "dopnats" should be --dopants--.

In column 26, line 59, claim 4, line 1 after "material'" --(previously presented)-- should be inserted.

Signed and Sealed this

Thirty-first Day of July, 2007

JON W. DUDAS
*Director of the United States Patent and Trademark Office*